United States Patent [19]

Nevin

[11] 3,879,729

[45] Apr. 22, 1975

[54] MOVING TARGET INDICATOR WITH MINIMUM CLUTTER INTERFERENCE

[75] Inventor: Robert Leland Nevin, New Hartford, N.Y.

[73] Assignee: General Electric Company, Utica, N.Y.

[22] Filed: July 23, 1973

[21] Appl. No.: 381,825

[52] U.S. Cl. ............... 343/7 A; 343/5 CM; 343/7.7; 343/17.1 R
[51] Int. Cl. ............................................. G01s 9/42
[58] Field of Search. 343/7.7, 7 A, 17.1 R, 17.1 PF, 343/5 CM

[56] References Cited
UNITED STATES PATENTS

| | | | |
|---|---|---|---|
| 2,710,398 | 6/1955 | Emslie | 343/7.7 |
| 2,797,412 | 6/1957 | Baker, Jr. | 343/7.7 |
| 3,157,875 | 11/1964 | Matsukasa et al. | 343/7.7 |
| 3,222,602 | 12/1965 | Gager et al. | 343/7.7 |
| 3,343,162 | 9/1967 | Evans | 343/7.7 |
| 3,643,257 | 2/1972 | Thomson et al. | 343/7.7 |
| 3,721,978 | 3/1973 | Doggett, Jr. | 343/7.7 X |
| 3,775,768 | 11/1973 | Lisle et al. | 343/7.7 |
| 3,787,851 | 1/1974 | Hughes | 343/7.7 |

*Primary Examiner*—Malcolm F. Hubler
*Assistant Examiner*—G. E. Montone

[57] ABSTRACT

A radar moving target indicator system employs a cancellation filter having the width of its cancellation notch controlled in accordance with the angle of the radar scan. As the antenna scans at wide angles (30° to 50° from the line of movement of the radar platform) the frequency response of the filter is switched so that the cancellation notch is wide. The notch is narrowed for smaller scan angles. AC switching transients in the radar output display are eliminated by keeping the circuit parameters constant for those portions of the filter which see D.C. components of the input signal.

10 Claims, 9 Drawing Figures

3,879,729

MOVING TARGET INDICATOR WITH MINIMUM CLUTTER INTERFERENCE

BACKGROUND OF THE INVENTION

This invention relates to systems for detecting relatively slowly moving objects from a high speed platform (such as an aircraft) by the use of radar techniques.

Pulsed radar systems having the so called PPI data output display operate by repeatedly scanning the field of view with high frequency RF radiation projected by a relatively narrow beam antenna which is pivoted through a scan angle. Radiation is emitted from the antenna in the form of narrow width pulses typically of 0.2 to 2.0 μs duration. After each pulse is transmitted the receiver is turned on for an interval determined by the range of the system. That is to say, the receiver is turned on starting at the time when reflected energy reaches the receiver from the nearest desired range point and is left on until the reflection is received from the most distant desired range point. Using pulse repetition frequencies (PRF) of, for example, 2,000 to 5,000 pulses per second ranges of from 10 to 30 nautical miles may be obtained (the longest range, of course, being obtained with the lowest PRF since the system must wait for the most distant reflection to return to the receiver before another pulse can be transmitted). The PPI display format is generated at the receiver on a device such as a CRT display. The CRT beam is deflected in a pattern of outwardly travelling radii with each radial display line representing the return data received from one radar pulse. The angular position of the line corresponds with the angular position of the transmitting antenna. As the CRT beam scans out from the apex the intensity of the beam is modulated by the return signal. The velocity of the CRT beam is synchronized to correspond with the velocity of propogation of the return signal such that reflection data is displayed on the CRT at a distance from the apex proportional to the distance of the displayed object from the radar antenna. This mode of exhibiting radar return data is generally referred to as a PPI display, as previously stated.

Of course, all objects lying within the field of view of the radar which are capable of reflecting high frequency RF radiation affect the content of the display. In many instances it is desirable to eliminate from the display the response caused by those portions of the return signals which are generated by stationary landscape features such as trees, hills, shorelines, etc. The intensity of these returns is usually so great that returns from smaller, objects of interest such as vehicles and the like are masked out.

Systems have been devised for discriminating between such objects on the basis of movement. So-called MTI (moving target indicator) radar signal processing systems suppress signals returned from stationary objects ("stationary clutter") and amplify signals returned from moving objects. These systems operate on the principle of differential analysis of the return signals. By this it is meant that the return signal derived from one radar pulse is fed into a difference circuit and compared with the return signal received from the preceding pulse or pulses. The comparison is usually performed by a filter circuit known as a single or double delay feed forward canceller. Such a circuit performs a synchronized comparison between successive radar return waveforms, i.e., the signals are matched at corresponding range points. The result is that those components of the signals representing reflections from the same stationary objects will cancel out and those portions of the signals representing reflections from a moving object will not exactly cancel out and the circuit will generate some form of output. This output, after some further processing, can be fed in the PPI display to provide a visual indication of the moving objects.

A significant problem in the use of non-coherent MTI systems (those that depend on detection of beat frequencies set up by the components of the return signal reflected by the moving object) has been that some degree of phase displacement of return signals is observed by the receiver due to the movement of the radar platform (e.g. aircraft). The effect is not observed when the radar scan direction is coincident with the line of movement (tracking line) of the platform but it does become apparent to progressively more significant degrees the more the scan line deviates from the track line. At scan angles of 30° to 50° from center the distortional effects become sufficiently large that stationary objects appear to the system as moving objects and the side edge segments of the PPI display become filled with interference (called stationary clutter) to the point that they are rendered useless for display of moving objects.

OBJECTS AND SUMMARY OF THE INVENTION

Accordingly, it is an object of the invention to provide an improved non-coherent moving target indicator system which eliminates stationary clutter interference.

It is another object to provide a moving target indicator system of the type described wherein stationary clutter is eliminated without the introduction of switching transients into the PPI display.

A further object is to provide a moving target indicator system of the type described which incorporates digital filtering techniques and which minimizes the number of digital components required.

A principal feature of the invention is the elimination of stationary clutter interference by providing a filter circuit which has controllable cancellation notch width. Means are provided for widening the cancellation notch as the antenna scans away from the tracking line so that at the side limits of the scan no portion of the broader clutter frequency band is passed through to the PPI display. As the scan moves in the opposite direction and closes on the tracking line the control sequence is reversed to progressively narrow the cancellation notch width so that accuracy of detection of slowly moving targets is preserved at scan angles near the tracking line.

Control of the cancellation notch width is accomplished by switching the parameters of the filter circuit as discrete scan angles to vary the frequency response for frequencies near 0 Hz. Undesirable AC transients are reduced to negligible proportions by avoiding the switching of parameters of those portions of the filter which process d.c. components of the input signal. Further means are provided to maintain the overall mean square gain of the filter constant as the frequency response is varied for notch width control.

These and other objects, features and advantages will be made apparent by the following description of a preferred embodiment of the invention, the description being supplemented by drawings as follows:

GENERAL DESCRIPTION OF THE EMBODIMENT

In non-coherent moving target indicator systems of the general type described herein slowly moving objects (e.g., such as ground vehicles movving at from 5 mph to 50 mph) are detected by observing the beat frequencies generated in rf signals reflected from the moving objects and from nearby stationary objects. The frequencies generated in beating together two waveforms containing essentially the same stationary (clutter) return data fall in a narrow frequency band near zero Hz. When a moving object is set amongst the clutter beat frequencies substantially above 0 Hz are generated and the magnitude of these higher frequencies are substantially proportional to the component of the velocity of the moving object which is in the direction of the radar beam. Such non-coherent MTI systems have the advantage of being relatively simple since they are relatively unaffected by the velocity of the platform, and they do not require the maintenance of an absolute phase reference standard.

Figure 1A:
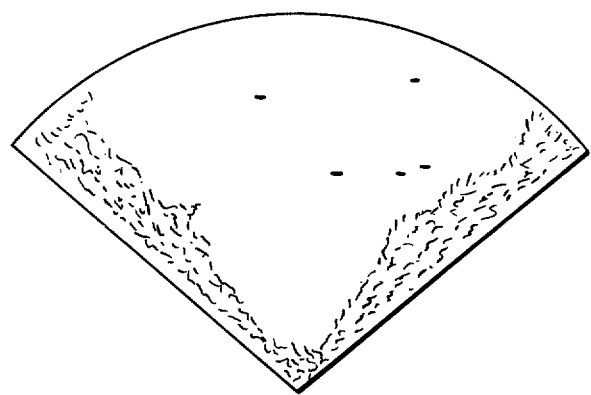
FIGS. 1a and 1b are diagrams depicting a PPI radar display with the effects of stationary clutter (FIG. 1a) and without the stationary clutter effects (FIG. 1b).

Non-coherent MTI systems are however, sensitive to stationary clutter returns which are generated when the radar beam is scanned through angles deviating an appreciable amount (such as 30° to 50°) from the tracking line of the platform. Stationary clutter is caused by beat frequencies generated by signal returns from stationary objects due to divergence of the radar beam. That is to say, when the beam is returned along the tracking line or at a small angle with respect thereto phase displacements of signal returns from stationary objects which are attributable to the velocity of the platform cancel out since they are all essentially equal. However, as the beam angle diverges from the tracking line the phase differences across the beam width (typical divergence of about 1.6°) which are produced by the velocity component of the platform become significant. The velocity component is coupled into the return signal in proportion to the sine of the angle between the tracking line and the object generating the return. The result is that signal components from stationary objects produce beat frequencies which spread out from 0 Hz as the angle of the scan increases. These frequencies, if passed to the PPI display, generate stationary clutter in the side areas of the viewing quadrant as shown in FIG. 1a.

Figure 2A:
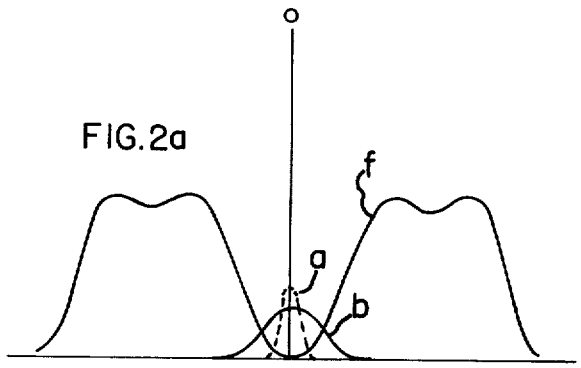
FIGS. 2a and 2b are waveforms diagrams illustrating a typical MTI filter frequency response curve for a filter with a narrow cancellation notch (FIG. 2a) and for a filter with a wide cancellation notch (FIG. 2b).

In previous systems the problem of stationary clutter has been resolved through the use of filter circuits having a frequency response of 0 to 0 Hz with the response curve sloping away from 0 at a gradual rate. The portion of the frequency response curve which is close to the abscissa is referred to as the rejection or cancellation notch of the detection filter. FIG. 2a shows a response curve f exhibiting a relatively narrow cancellation notch while FIG. 2b shows a response curve f' having a relatively wide notch.

Of course, as the cancellation notch width is made wider the system becomes less sensitive to slowly moving targets since near-zero beat frequencies generated by slowly moving targets are rejected by the notch along with the stationary clutter. It is therefore desirable to make the rejection notch as narrow as possible while keeping it wide enough to eliminate most stationary clutter. The cancellation notch in the frequency response curve shown in FIG. 2a is set to reject substantially all stationary clutter frequencies occurring at a scan angle of zero (curve a). A system with such a frequency response will be highly effective in detecting slow movers located near the tracking line. However, when the scan angle deviates on the order of 30° to 50° off the tracking line the frequency distribution of the stationary clutter spreads out as shown by the curve b. A substantial portion of the stationary clutter frequencies will be passed to the PPI display with the result shown in FIG. 1a. Slow movers located at angles greater than 30° off the tracking line will be obscured, probably totally masked, by the clutter.

Figure 1B:
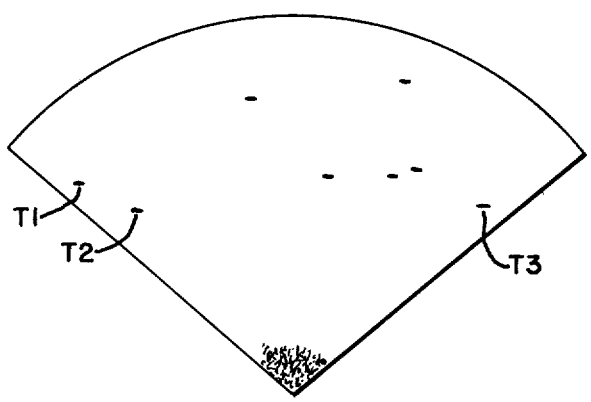
Figure 2B:
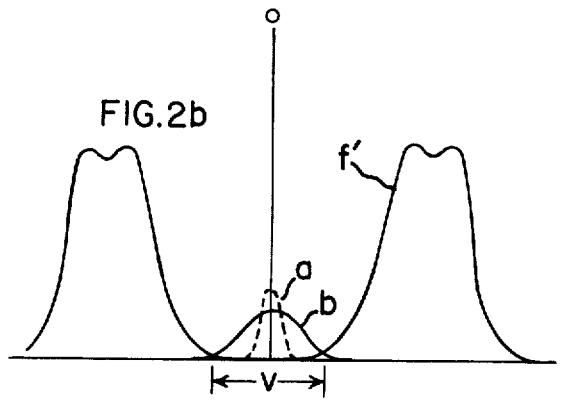

To eliminate clutter interference the filter may be provided with a wider cancellation notch such as exhibited by the frequency response curve f' shown in FIG. 2b. There, the frequency distribution of the stationary clutter (curves a and b) is the same as shown in FIG. 2a. However, the dense pattern of clutter is eliminated from the side edges of the display since the cancellation notch is wide enough to reject virtually all of the clutter frequencies including those generated at the larger scan angles. The result is shown in FIG. 1b. As there shown three additional targets T1, T2 and T3 located near the side edges of the display are detected. It should be noted that the system having the frequency response f' is unable to detect slowly moving targets falling within the range of velocities V shown in FIG. 2b and thus is less effective than the system of FIG. 1a in detecting slow movers located near the tracking line.

Figure 3:
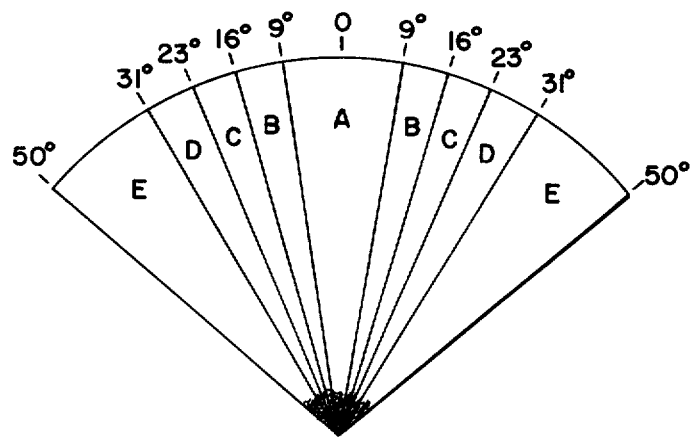
FIG. 3 is a diagram showing a PPI radar display wherein transient effects of cancellation notch width switching control are not properly suppressed.

The present invention combines the sensitivity of the narrow notch system with the clutter rejection capability of the wide notch system by providing a cancellation filter having its frequency response characteristics controlled such that when the scan angle is small the rejection notch is narrow and when the scan angle is large the rejection notch is wide. The system hereinafter described employs five different degrees of frequency response A through E for the five scan zones 0°-9°, 9°-16°, 16°-23°, 23°-31°, and 31°-50°. The result is a pattern of frequency responses related to scan angle as illustrated in FIG. 3. For the center 18° scan segment (zone A) the frequency response of the filter is set relatively narrow such as illustrated in FIG. 2a. For the two outer zones E the frequency response is set such that a relatively wide cancellation notch, such as illustrated in FIG. 2b, is employed. In the intermediate zones intermediate frequency responses are employed.

Figure 4:
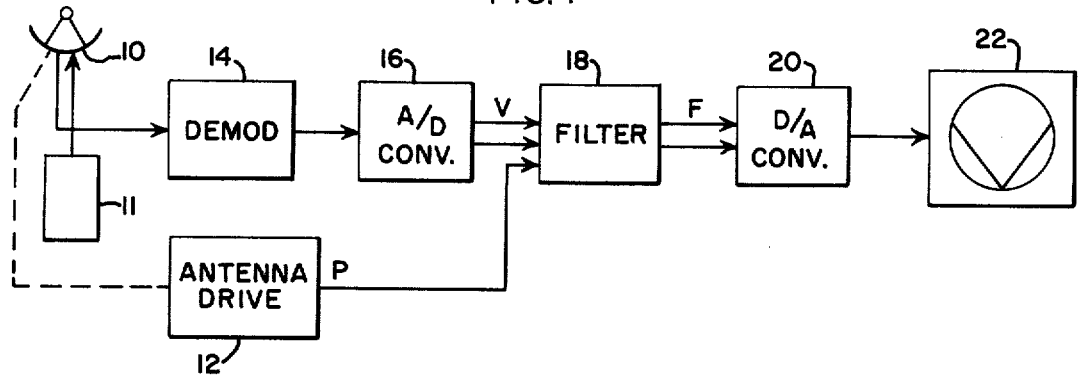
FIG. 4 is a schematic block diagram of a system incorporating the invention.

FIG. 4 shows a block diagram of the overall system of the present invention. The system may be mounted, for example, in an aircraft for the purpose of enabling the detection of slowly moving targets lying in front of the aircraft at ranges of up to 30 or 40 miles. An antenna 10 is mounted in the nose radome and is supplied with high frequency RF (microwave) pulse signals from a transmitter 11 incorporating a device such as a magnetron. The pulse repetition frequency (PRF) may be, for example, on the order of 2–5 KHz depending upon the maximum range desired. A typical transmission frequency for the pulses may be on the order of 16 GHz.

Signals reflected from targets in the field of view are received by antenna 10 and converted by a receiver 14 to a data signal. The data signal is sampled by an analog to digital converter 16 operating at a frequency of, for example, five MHz to provide a binary digital signal V. The signal V transmits in parallel a stream of eight bit bytes representing the instantaneous magnitude of the output from the receiver 14 at 0.2 microsecond "range cell" intervals.

The data bytes of the signal V are transmitted to a digital filter circuit 18 which extracts, in accordance with the principles of the invention hereinafter set forth, moving target information and feeds it via output signal F to a digital to analog converter 20. The latter converts the signal to an analog voltage and sends it to a CRT display device 22 for display in a PPI format.

Antenna 10 is mechanically driven through a repetitive scan pattern by antenna drive mechanism 12. The scan pattern may be, for example, a 100° segment extending 50° on either side of the tracking line of the aircraft. Antenna drive 12 transmits an antenna position signal P to filter circuit 18 to enable switching of the filter frequency response in accordance with the invention as set forth below.

Figure 5:
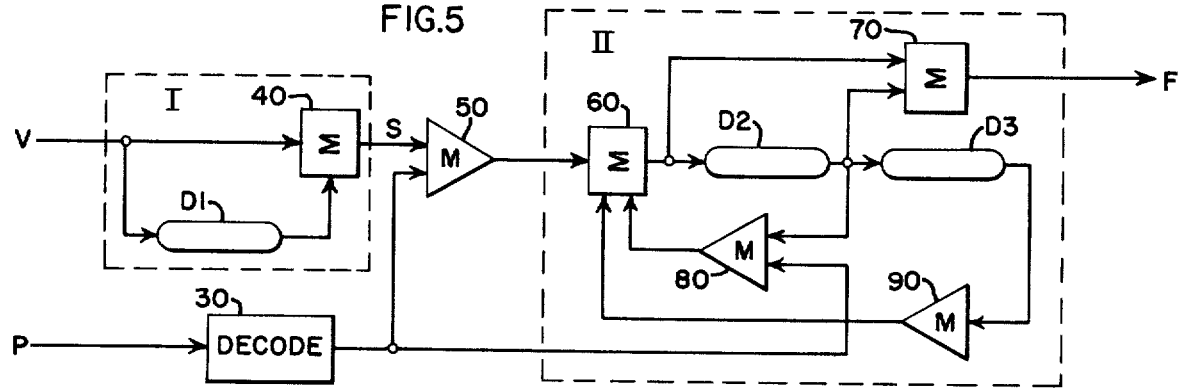
FIG. 5 is a schematic block diagram of the cancellation filter circuit of the invention.

The filter circuit 18 is shown in schematic block diagrammatic form in FIG. 5. The filter comprises two stages, stage I and stage II, with a multiplier circuit 50 connected in between. Stage I is a single delay feedforward canceller circuit comprising a delay circuit D1 and a summing circuit 40. The delay interval imposed by circuit D1 is exactly equal to the time between radar pulses, i.e., the sweep interval. Summing circuit 40 operates to subtract the eight bit byte it receives from delay circuit D1 from the eight bit byte presented by signal V from the A/D converter. The resultant difference signal S, which includes a sign bit plus eight bits of magnitude data, is transmitted to the input of multiplier 50. The transfer function of the stage I canceller is (z-transform notation):

$$G_1(Z) = \frac{Z-1}{Z}$$

where $Z = e^{j2\pi f/f_s}$

The frequency response is:

$$|G_1(f/f_s)|^2 = (1-\cos(2\pi f/f_s))^2 + \sin^2(2\pi f/f_s)$$

where fs = system PRF

The stage I canceller output signal S represents the difference between the waveforms received from each consecutive pair of transmitted radar pulses. It can be seen that if the two return waveforms are identical the output from the canceller will be zero. It may thus be said that the stage I canceller removes all of the d.c. component from the returned signal. Differences in the two waveforms will appear as positive or negative signal components in the signal S and will be scaled by multiplier circuit 50 and transmitted to stage II of the filter.

Stage II comprises a canceller circuit employing double delay feedback with a single delay canceller. The feedback delays are imposed by delay circuits D2 and D3 which provide delay intervals identical to that of delay circuit D1. The output from the multiplier 50 is combined in summing circuit 60 with the two feedback signals and fed to the single delay canceller comprising delay circuit D2 and summing circuit 70. The resultant output signal F represents the overall filter output. A multiplier 80 is incorporated in the first feedback loop and multiplier 90 is incorporated in the second feedback loop to provide the desired frequency response characteristics.

The stage II components together with multiplier 50 represent a shaped canceller circuit having a Z-transform transfer function represented by:

$$G_2(Z) = \frac{Z^2 - Z}{Z^2 + K_1 Z + K_2}$$

where $K_1$ and $K_2$ are the scaling factors of multipliers 80 and 90

The overall transfer function of the complete filter circuit, including stages I and II, is:

$$G(Z) = \frac{M(Z^2 - 2Z + 1)}{Z^2 + K_1 Z + K_2}$$

where M is the scaling factor of multiplier 50 and the overall frequency response is:

$$|G(f/f_s)|^2 = \frac{M^2[(\cos^2 F - 2\cos F + 1)^2 + (\sin^2 F - 2\sin F)^2]}{(\cos^2 F + K_1 \cos F + K_2)^2 + (\sin^2 F + K_1 \sin F)^2}$$

where $F = 2\pi f/f_s$

The scaling factors applied by multipliers 50 and 80 are controlled by the output from a decoding circuit 30 which operates in response to a position signal P transmitted from the antenna drive. Signal P tracks the scan angle of the radar antenna and may be obtained, for example, by subtracting the signals on two wires of the 3-wire output from the stator winding of a rotary transformer connected to the antenna shaft. Decoding circuit 30 converts the analog input P into five discrete mutually exclusive output signals A, B, C, D and E representing five different scan angle zones A,B,C,D and E depicted in FIG. 3.

By adjusting the scaling factors applied by multipliers 50 and 80 in accordance with the scan angle the overall frequency response of the filter circuit is changed to progressively widen the cancellation notch as the scan angle moves away from the tracking line and to progressively narrow the cancellation notch as the scan angle moves back toward the tracking line. As previously explained, this eliminates substantially all of the stationary clutter frequency components from the signal transmitted to the PPI display and at the same time optimizes the sensitivity of the system to slowly moving targets.

The overall filter configuration is that of a classical double delay canceller with feedback except that one of the cancellation stages has been pulled out and implemented as a pre-canceller (stage I). This serves to keep the d.c. component of the stationary clutter return out of the section where the feedback occurs. If this d.c. component were allowed in the feedback portion it would cause a serious transient oscillation in the canceller output each time the feedback coefficients were changed. Such transient oscillations would appear in the PPI display as a series of heavy radial lines separating the different frequency response zones A-E in the manner illustrated in FIG. 3. The appearance of such lines on the display would obscure target data and thus would constitute a substantial drawback.

The scaling factor applied by multiplier 50 is changed each time the feedback coefficient factor applied by multiplier 80 is changed. The values of these two multiplier factors are calculated to maintain an average power gain of unity through the canceller. This allows switching the canceller notch width without a disturbing change in the level of the background noise. The multiplier 50 is placed between the two canceller stages because such placement reduces somewhat the dynamic range required in the shaped canceller (stage II), thus effecting a reduction in the number of bits required to be handled in the parallel byte transfer lines of the stage II circuits. The number of bits transferred at each point in the canceller should be carefully selected so that the requantization noise generated in the canceller does not significantly exceed the quantization noise at the canceller input due to the A/D conversion. Requantization noise is the result of random errors occurring each time some of the least significant bits are dropped from the digital representation of a signal (such as occurs during multiplication).

DETAILED DESCRIPTION OF THE EMBODIMENT

Figure 6A:
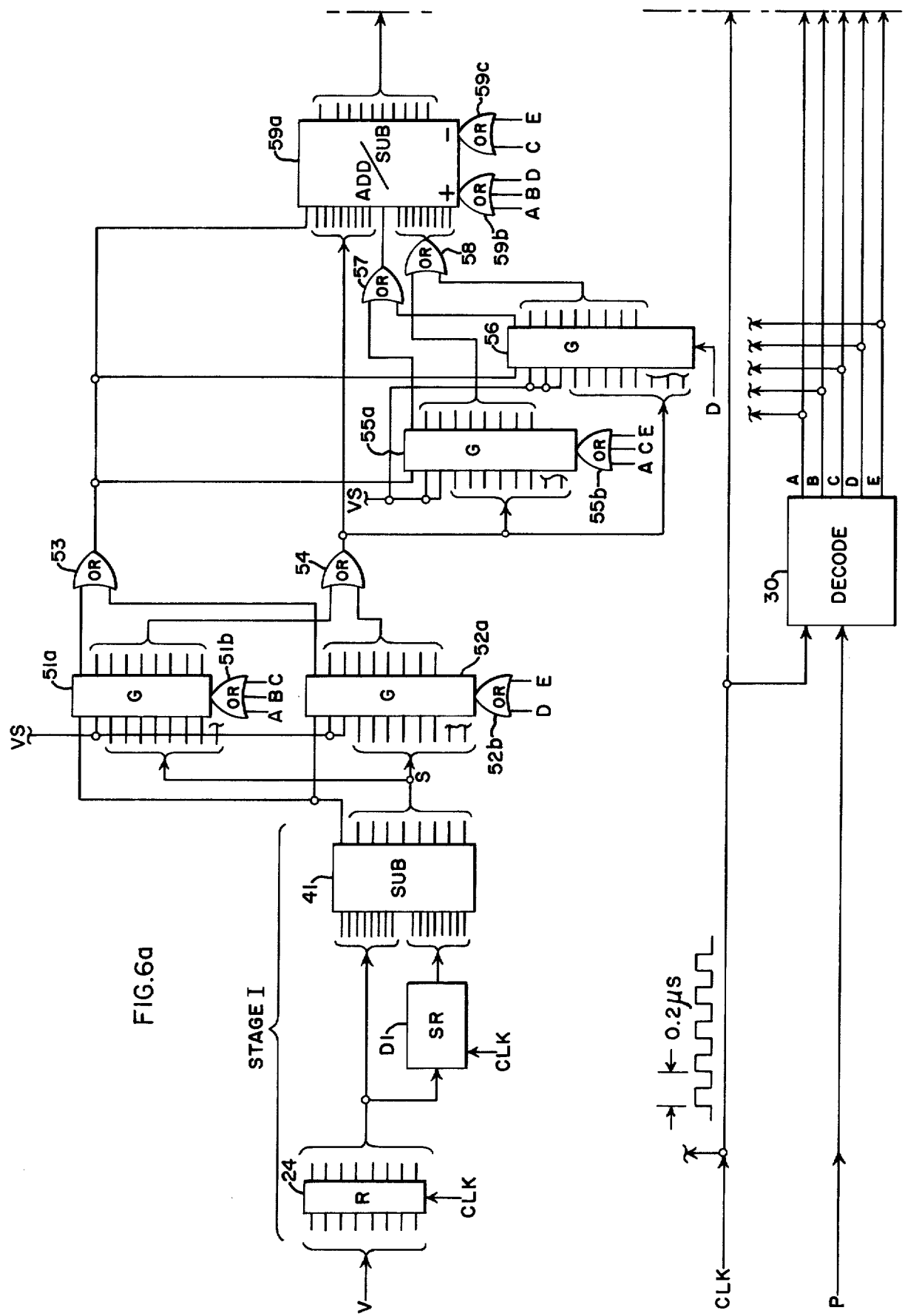
FIGS. 6a and 6b, taken together side-by-side, constitute a detailed schematic circuit diagram of the cancellation filter circuit of FIG. 5.
Figure 6B:
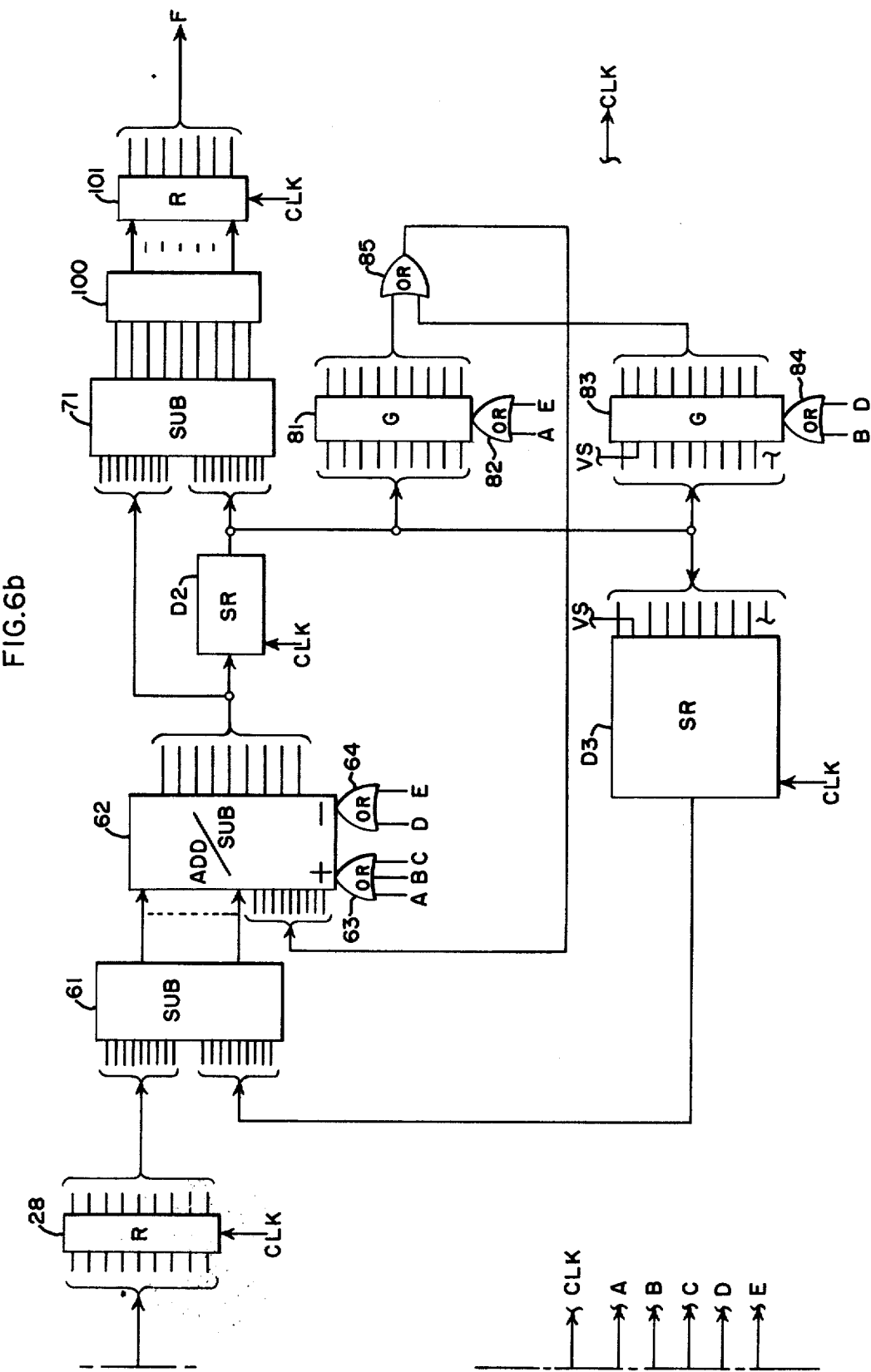

FIGS. 6a and 6b illustrate a detailed circuit implementation of the digital filter shown schematically in FIG. 5. For ease in understanding of the following description it is recommended that the two figures be laid side by side with FIG. 6a on the left so that the complete circuit can be viewed as an entity. As a further aid in comparing the detailed circuit against the schematic of FIG. 5 circuit elements in the former have been given reference numerals corresponding to their counterpart shown in FIG. 5. For example, elements of FIG. 6 numbered in the 50's operate in combination to perform the function of element 50 of FIG. 5. FIG. 6 has been simplified by showing multiple line byte transfer channels as a single line either emanating from or terminating at an input or output bracket spanning the number of lines included in the channel.

A timing signal CLK received from A/D converter 16 (FIG. 4) is employed to time the operation of the digital portion of the system including A/D converter 16, filter 18 and D/A converter 20. CLK is generated by a gated oscillator (not shown) located in the A/D converter 16 and has a frequency of 5 MHz corresponding to the A/D conversion frequency. The oscillator is turned on at some predetermined time after the transmission of a radar pulse and is turned off a set time thereafter determined by the useful range of the system.

The stage I portion of the circuit includes an eight bit storage register 24 connected to feed the inputs of a shift register D1 and a subtraction circuit 41. Shift register D1 corresponds to the delay circuit D1 of FIG. 5 and is made up of eight parallel arrays of shift stages equal in number to the number of 0.2 us range cells required to cover the system range. The output from the shift register is presented to the second input of subtractor 41 and the latter thus generates an output signal S consisting of a nine bit byte representing a signed difference quantity. Register 24 operates in response to each positive shift in CLK to store the digital information then existing in the input signal V. At the same instant CLK causes the shift register to receive the new data byte into the low order position of the shift register and to shift all other stored bytes one position to the right.

The nine bit output from subtractor 41 is presented to the inputs of a pair of gate circuits 51a and 52a. The latter two circuits plus OR circuits 53 and 54, gate circuits 55a and 56, OR circuits 57 and 58 and add/subtract circuit 59a perform the function of the scaling multiplier 50 of FIG. 5.

Depending upon the then existent antenna angle one of the two gate circuits 51a and 52a will pass the nine bit output from subtractor 41 to the upper set of inputs to add/subtract circuit 59a. OR circuit 53 transmits the sign bit and OR circuit 54 transmits the data byte. OR 54 is shown as a single circuit for simplification purposes only and in actuality comprises eight parallel OR circuits each receiving two inputs from corresponding outputs of the gate circuits 51a and 52a.

It should be noted that the high order data bit transferred from the output of subtractor 41 is presented to the next to highest order digit position of gate 51a and the high order position thereof is connected to a voltage storage VS. The latter is chosen to match the voltage level employed in the system to represent binary zero and thus the high order bit position at the input of gate 51a is wired to continually transmit a zero bit. The low order bit from subtractor 41 is not connected to the input of gate 51a, as indicated in FIG. 6a, and is thus dropped. Hence the output from gate 51a represents the output from subtractor 41 shifted one digit position toward the low order end. This is equivalent to multiplication by a factor of one-half. The sign bit, of course, is transferred unchanged.

In a similar fashion the output from subtractor 41 is shifted two digit positions toward the low order end in being transferred to gate 52a and thus the output from the latter circuit is equal to one-quarter of the subtractor output.

The output from the active gate 51a or 52a, besides being transmitted to the input of add/subtract circuit 59a, is also presented to the inputs of a second pair of gate circuits 55a and 56. The former circuit performs a "wired shift" multiplication by a factor of one-quarter in the manner described above. Gate 56 multiplies by a factor of oneeighth due to a three digit wired shift at its input. The output from the active one of gates 55a and 56 is transmitted via OR circuits 57 and 58 to the second input of add/subtract circuit 59a. OR 57 conveys the sign bit and OR 58, which is in actuality a series of ORs as described previously for OR 54, conveys the eight bit data byte.

The output from add/subtract circuit 59a is a nine bit byte (one sign bit plus eight data bits) which is equal to the output from subtractor 41 multiplied times a scaling factor determined by the state of the four gates 51a, 52a, 55a and 56. The gates are energized in selected combinations by the decode circuit 30. As previously mentioned, the mutually exclusive signals A,B,C,D and E generated by decoder 30 represent scan angle of the antenna. FIG. 3 illustrates the correlation between the signals A through E and the scan. Gate circuit 51a is actuated by the output from an OR circuit 51b which is in turn enabled by each of the three decoder outputs A,B and C. Similarly gate 52a is opened by the output from OR 52b only during scan segments D and E while gate 55a is opened by OR 55b during scan segments A, C and E. Gate 56 is opened only during the D scan segment.

Add/subtract circuit 59a is controlled by a pair of OR circuits 59b and 59c to operate in either the add or the subtract mode under control of the outputs from decoder 30. During scan segments A, B and D decoder 30 activates OR 59b and add/subtract circuit 59a operates to add the bytes presented at its inputs. During scan segments C and E OR 59c switches circuit 59a to the subtract mode whereupon the byte presented at the lower set of inputs is subtracted from the byte presented at the upper set of inputs.

Thus, for example, during scan segment A (the antenna is scanning through a zone bounded by an angle of 9° on either side of the tracking line) gates 51a and 55a are opened by the A output from decoder 30 while gates 52a and 56 remain closed. Add/subtract circuit 59a operates in the add mode. The output from circuit 59a is thus equal to one-half plus one-eighth of the amount represented at the output of subtractor 41. That is to say the upper set of inputs to add/subtract circuit 59a receive a data byte representing a quantity equal to one-half the output from subtractor 41 as determined by gate 51a and the lower set of inputs to circuit 59a receive a data byte representing one-quarter of the amount represented at the output of gate 51a is determined by gate 55a. In this situation thus the output from add/subtractor 59a is five-eighths or 0.625 of the magnitude of the signal S.

The complete range of scaling factors is as follows:
scan zone A-0.625 (5/8)
scan zone B-0.500 (1/2)
scan zone C-0.375 (3/8)
scan zone D-0.281 (9/32)
scan zone E-0.187 (3/16)

Stage II of the filter circuit is shown in FIG. 6b. The output from add/subtractor 59a is gated into a nine bit storage register 28 on each positive transition of CLK. The nine bit byte stored in register 28 is presented to the upper inputs of subtraction circuit 61. The output from subtractor 61 is presented to the upper inputs of an add/subtract circuit 62. The output from the latter is presented in parallel to the upper inputs of subtraction circuit 71 and to the input to shift register D2. The output from the latter is presented to the lower inputs of subtractor 71, to the inputs of a pair of gate circuits 81 and 83 and to the input to shift register D3. It is noted that the output from shift register D2 is multiplied by one-half at the input to gate 83 and at the input to shift register D3.

The output from shift register D3 is coupled back to the lower input to subtractor 61. The latter connection represents the feedback loop incorporating multiplier 90 as shown in FIG. 5. In the circuit of FIG. 6b the multiplication factor applied by multiplier 90 of FIG. 5 is effected by the single digit wired shift at the input to shift register D3.

The outputs from gates 81 and 83 are coupled through an OR circuit 85 back to the lower set of inputs to add/subtractor 62. This connection is equivalent to the feedback loop shown in FIG. 5 as incorporating the multiplier 80. Gates 81 and 83 are controlled by scan zone signals A, E, B and D through OR circuits 82 and 84, respectively, to vary the multiplication factor applied to the feedback. Further, add/subtractor 62 is controlled by a pair of OR circuits 63 and 64 to operate in the add mode in response to scan zone signals A, B and C and to operate in the subtract mode in response to scan zone signals D and E. It is noted that during scan zone C neither of the gates 81 or 83 is activated and thus no feedback data is presented to the lower set of inputs of add/subtractor 62. The latter in that situation operates simply to pass the output from subtractor 61 through unchanged.

The multiplication factor applied to the second feedback loop (connected to the lower set of inputs to subtractor 61) is a constant one-half. The multiplication factor applied to the first feedback loop (that directed to the lower set of inputs to add/subtractor 62) is unity during scan zones A and E (as determined by gate 81), is one-half during scan zones B and D (as determined by gate 83), and is zero during scan zone C.

The output from subtractor 71 is processed by a sign remover circuit 100 and transmitted to a seven bit storage register 101. Circuit 100 considers the seven lowest order bits of the eight bit data byte together with the sign bit and converts the magnitude indicated thereby to a positive magnitude and transmits the result to register 101 in the form of a seven bit data byte. Register 101 receives and stores the output from sign remover 100 on each positive shift of CLK. The output from the register constitutes the overall filter output signal F which is transmitted to the D/A converter 20 of FIG. 4 and processed thereby for presentation to the PPI display.

OPERATION

Referring to FIGS. 4, 6a and 6b the operation of the system will be described hereinafter. As antenna 10 scans from one side of the field of view to the other the signal P which is received by decode circuit 30 generates the following succession of signals: E,D,C,-B,A,B,C,D and E. In accordance with this sequence of signals gate circuits 51a, 52a 55a, 56, 81 and 83 and add/subtractor circuits 59a and 62 are switched to provide the various different multiplication factors set forth in the above description. This results in the frequency response curves of filter 18 being varied from a shape such as illustrated by curve f′ of FIG. 2b (applicable for scan zones E) to a shape such as that illustrated by the curve f shown in FIG. 2a (for scan zone A). This switching action causes the cancellation notch of the filter to be varied in accordance with the width of the spectral distribution of the clutter frequencies whereupon a PPI display is generated virtually without stationary clutter interference. The system maintains close to optimum sensitivity to slowly moving targets throughout the scan.

Distortion due to switching transients is eliminated from the display by keeping the circuit parameters of the stage I filter components constant.

While the above described embodiment divides the scan zone into nine segments for purposes of frequency response control it has been found that a smaller number of zones, such as five, will also result in adequate performance. Of course, a number of zones in excess of nine could also be used depending on the circumstances and application. It will be appreciated that various additional changes in the form of details of the above-described preferred embodiment may be effected by persons of ordinary skill without departing from the true spirit and scope of the invention.

I claim:

1. In a moving target detection system for use on a moving platform the combination comprising:

transmission means for projecting pulses of electromagnetic radiation;

scanning means operating on said transmission means to vary the direction of projection of said pulses in a repetitive scan pattern covering a field extending on at least one side of the tracking line of said platform;

means for receiving data signals reflected from objects within said field, each successive set of data signals representing the return from a different one of said radiation pulses;

a filter circuit connected to said receiving means and having at least two stages, a first of said stages being operable to generate an intermediate signal representing the difference between two successive sets of data signals, said second of said stages operating on said intermediate signal to attenuate frequency components thereof in a band centered about 0 Hz;

tuning means for varying the parameters of said filter circuit other than the parameters of said first stage to alter the overall frequency suppression characteristics of said circuit for frequencies near 0 Hz;

means for operating said tuning means in synchronism with said scanning means to widen the band of said suppressed near-zero frequencies as the direction of projection of said radiation pulses deviates away from said tracking line and to narrow the band of said suppressed frequencies as said projection direction closes toward said tracking line.

2. The system set forth in claim 1 further comprising: means for displaying the output of said filter circuit.

3. The system set forth in claim 2 wherein said display means comprises a CRT device operating to display each series of outputs from said filter circuit on a radial line diverging from a center point representing the instantaneous position of said moving platform.

4. A filter circuit for use in analyzing radar return signals generated by a pulsed radar system carried on a moving platform and arranged to scan from side-to-side across a field of view extending on either side of the line of movement of said platform comprising, in combination:

a first canceller circuit receiving the radar return signals and generating a signal representing the difference between the return signals received from each successive pair of radar pulses;

a multiplier circuit connected to operate on the output of said first canceller;

a second canceller circuit connected to operate on the output of said multiplier; and control means responsive to the angle of said scan relative to said line of movement for changing the parameters of said second canceller to alter the frequency response of said filter and for simultaneously changing the parameters of said multiplier to maintain the overall average gain of said filter substantially constant.

5. The filter circuit set forth in claim 4 wherein said first canceller comprises a single delay feed-forward canceller circuit incorporating a delay element constructed and arranged to impart to said return data a delay substantially equal to the time interval between said radar pulses.

6. The filter circuit set forth in claim 4 wherein said second canceller comprises a double delay feedback filter having means actuatable by said control means for varying the magnitude and sign of the feedback signal transmitted by at least one of the feedback delay loops.

7. The filter circuit set forth in claim 4 wherein said control means comprises:

means for generating a scan signal tracking the scan angle; and means responsive to said scan signal for changing the parameters of said second canceller in a first predetermined sequence when said system is scanning away from the line of movement of said platform and for changing said parameters in an opposite sequence when said system is scanning toward said line of movement, said first predetermined sequence operating to progressively increase the range of low frequency signal components suppressed by said filter and said opposite sequence operating to progressively decrease the range of low frequency signal components suppressed by said filter.

8. The method of detecting the position of moving objects from a high speed platform comprising the steps of:

projecting pulsed rf energy in a scan pattern subtending an angle deviating from the tracking line of said platform;

processing received signal returns in a canceller circuit having a cancellation notch centered about zero Hz and displaying the output therefrom in a PPI display format; and varying the parameters of said canceller circuit to control the width of said cancellation notch in accordance with the angle of said scan, the circuit parameters so varied being only those affecting the a.c. components of said signal returns.

9. The method set forth in claim 8 comprising the further step of varying the parameters of said canceller circuit in accordance with the angle of said scan to maintain a constant average power gain through the canceller.

10. The method set forth in claim 8 wherein said circuit parameters of said canceller are varied in a manner such as to match the width of said cancellation notch throughout said scan to the width of the frequency band embodying substantially all signal frequencies attributable to returns from stationery objects.

* * * * *